(12) United States Patent
Hirano et al.

(10) Patent No.: US 12,461,361 B2
(45) Date of Patent: Nov. 4, 2025

(54) ELECTROMAGNETIC WAVE SENSOR COVER

(71) Applicant: TOYODA GOSEI CO., LTD., Kiyosu (JP)

(72) Inventors: Risa Hirano, Kiyosu (JP); Koji Fukagawa, Kiyosu (JP); Hiroaki Ando, Kiyosu (JP)

(73) Assignee: TOYODA GOSEI CO., LTD., Aichi (JP)

( * ) Notice: Subject to any disclaimer, the term of this patent is extended or adjusted under 35 U.S.C. 154(b) by 566 days.

(21) Appl. No.: 17/899,125

(22) Filed: Aug. 30, 2022

(65) Prior Publication Data

US 2023/0074221 A1 Mar. 9, 2023

(30) Foreign Application Priority Data

Sep. 9, 2021 (JP) .................. 2021-147021

(51) Int. Cl.
*G02B 5/28* (2006.01)
*G01S 7/481* (2006.01)
*G02B 27/00* (2006.01)
*G01S 7/497* (2006.01)

(52) U.S. Cl.
CPC ........ *G02B 27/0006* (2013.01); *G01S 7/4813* (2013.01); *G02B 5/281* (2013.01); *G01S 2007/4977* (2013.01)

(58) Field of Classification Search
CPC ... G02B 27/0006; G02B 5/281; G01S 7/4813; G01S 2007/4977; G01S 7/4811
See application file for complete search history.

(56) References Cited

U.S. PATENT DOCUMENTS

2020/0094781 A1   3/2020   Ota et al.

FOREIGN PATENT DOCUMENTS

| DE | 10 2019 102 295 A1 | 7/2020 |
|---|---|---|
| JP | 2018-031888 A | 3/2018 |
| JP | 2019-137380 A | 8/2019 |
| JP | 2019-168647 A | 10/2019 |
| JP | 2020-165943 A | 10/2020 |
| WO | 2018/052057 A1 | 3/2018 |

OTHER PUBLICATIONS

Extended European Search Report dated Jan. 30, 2023 issued in corresponding EP Patent Application No. 22194226.1.

*Primary Examiner* — Ryan D Howard
(74) *Attorney, Agent, or Firm* — Posz Law Group, PLC

(57) ABSTRACT

An electromagnetic wave sensor cover includes a cover body. The cover body includes a base layer made of synthetic resin and permitting passage of an electromagnetic wave, one or more metal oxide layers permitting passage of the electromagnetic wave and being conductive, one or more low refractive index layers permitting passage of the electromagnetic wave and made of material that has a lower refractive index than material of the metal oxide layer, and two electrodes. The base layer includes a front surface and a rear surface in a transmission direction of the electromagnetic wave. The metal oxide layer and the low refractive index layer are laminated adjacent to each other in the transmission direction. A laminate of the metal oxide layer and the low refractive index layer is laminated on the front surface or the rear surface of the base layer.

6 Claims, 2 Drawing Sheets

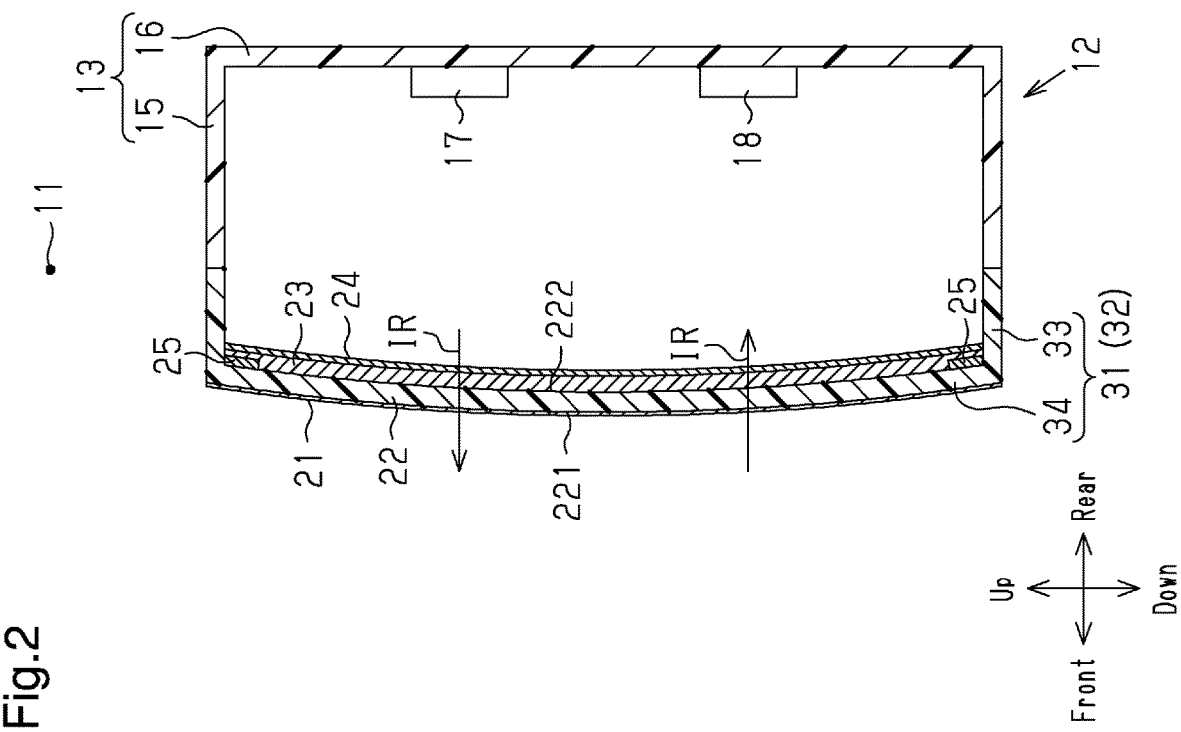
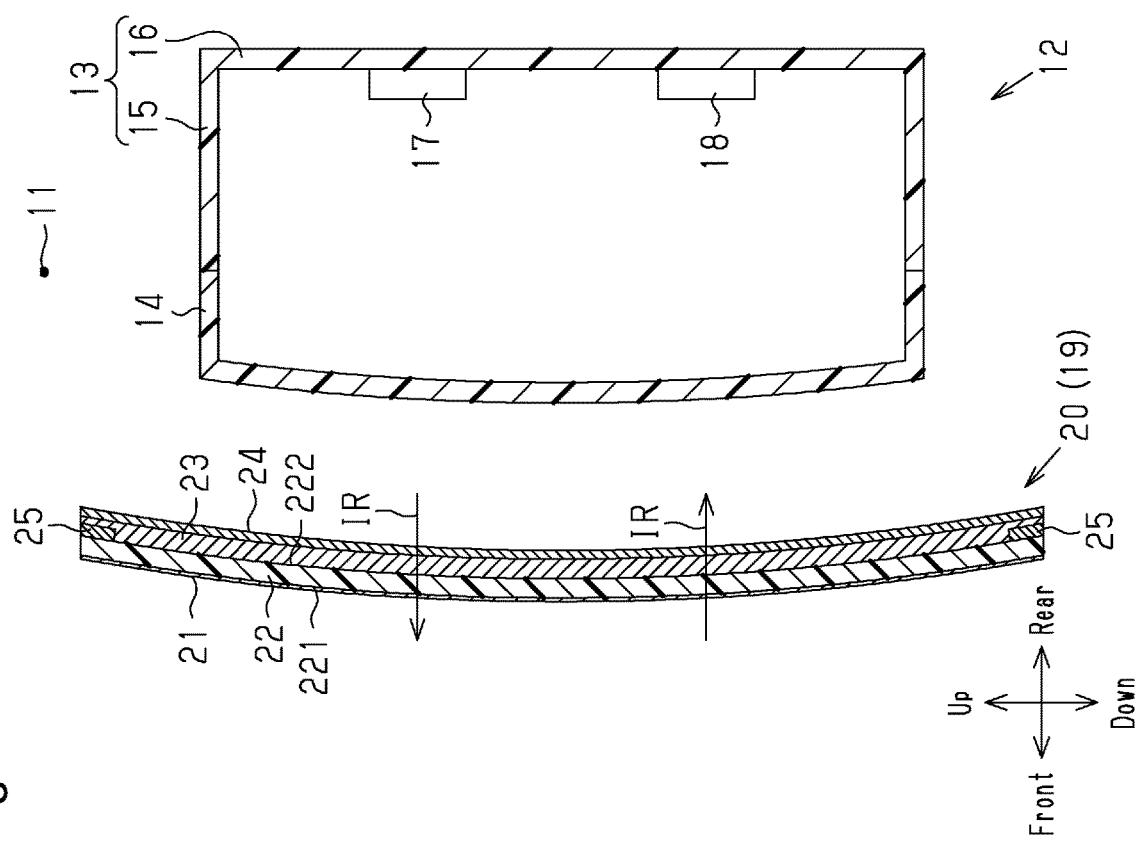

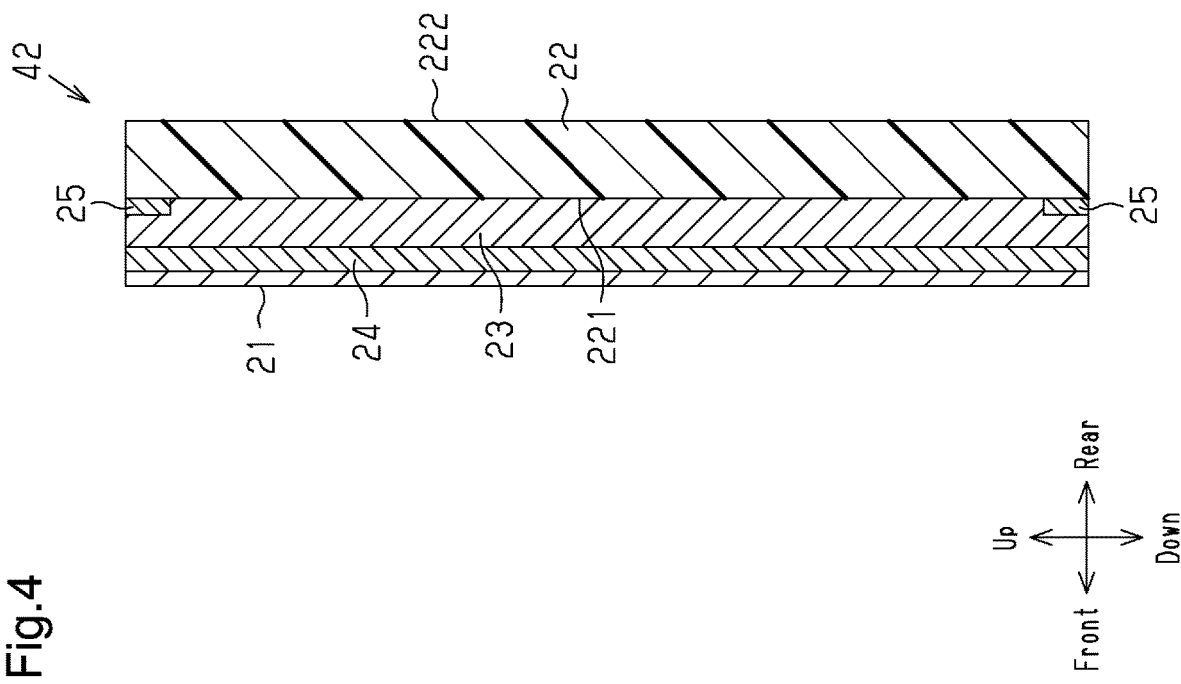
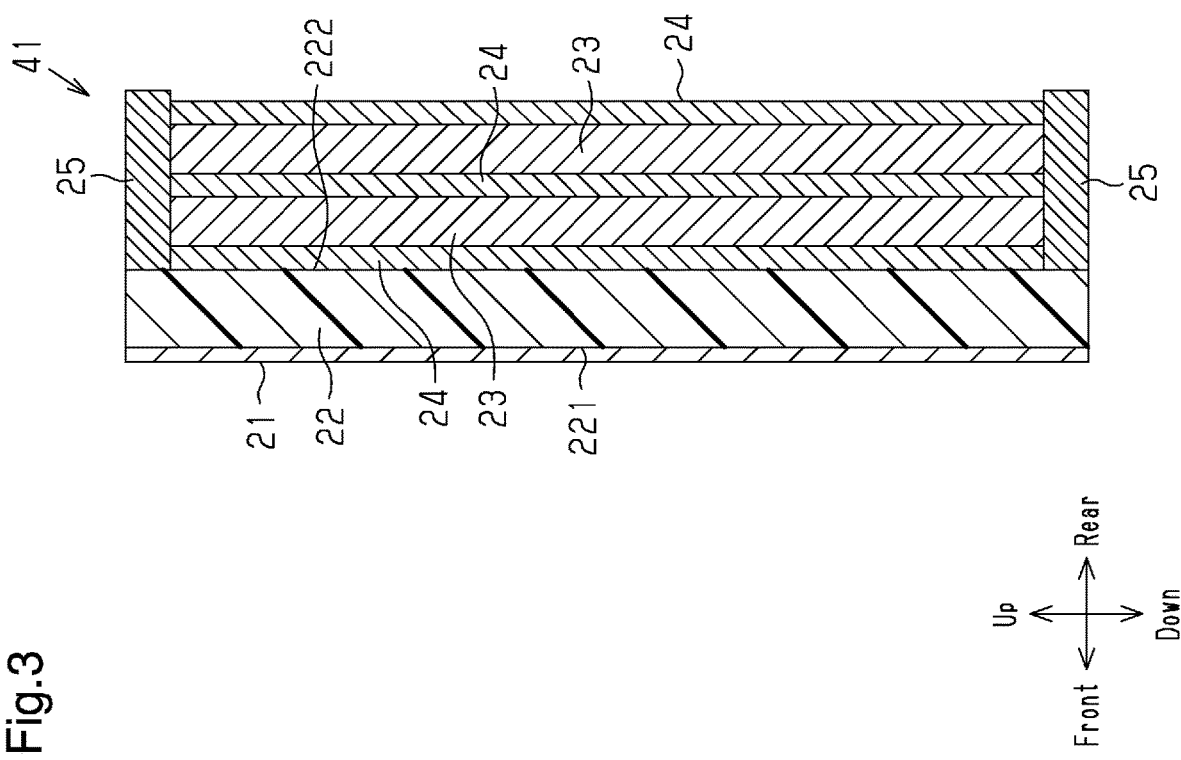

ELECTROMAGNETIC WAVE SENSOR COVER

1. FIELD

The present disclosure relates to an electromagnetic wave sensor cover.

2. DESCRIPTION OF RELATED ART

Vehicles (e.g., automobiles) are equipped with an infrared sensor as an example of an electromagnetic wave sensor. The infrared sensor transmits and receives infrared rays (electromagnetic waves). The infrared sensor transmits infrared rays toward the outside of a vehicle and receives the infrared rays that have struck and have been reflected by an object outside of the vehicle. By transmitting and receiving the infrared rays in such a manner, the infrared sensor detects the object outside of the vehicle.

An infrared sensor cover (electromagnetic wave sensor cover) is arranged on the front side (the outside of the vehicle) of the infrared sensor in a transmission direction of infrared rays. The infrared sensor cover is used to prevent the infrared sensor from being directly seen from the outside of the vehicle.

Known examples of such an infrared sensor cover include an infrared sensor cover disclosed in Japanese Laid-Open Patent Publication No. 2020-165943. Such an infrared sensor cover includes a cover base, a heater wire, and an anti-reflection (AR) coating layer. The cover base is located on a path of infrared rays that are transmitted and received by the infrared sensor. The heater wire is disposed on the front surface of the cover base. The heater wire generates heat when energized. The AR coating layer limits the reflection of infrared rays.

The above-described infrared sensor cover is configured to melt ice and snow that adhere to the infrared sensor cover using the heat generated by the heater wire. This limits situations in which the adhesion of ice and snow to the infrared sensor cover prevents the passage of infrared rays. In addition, the AR coating layer of the above-described infrared sensor cover limits the reflection of infrared rays. Thus, the infrared sensor cover limits a decrease in the detection accuracy of the infrared sensor.

In the infrared sensor cover, while the AR coating layer limits the reflection of infrared rays, the heater wire is arranged so as to extend in a serpentine manner at a predetermined pitch. Thus, causing the heater wire to generate heat produces a temperature difference between a portion of the infrared sensor cover that includes the heater wire and a portion of the cover that does not include the heater wire. Thus, the infrared sensor cover is not evenly heated. Accordingly, the ice and snow that adhere to the infrared sensor cover are not able to be efficiently melted.

Accordingly, an electromagnetic wave sensor cover capable of being evenly heated while limiting the reflection of electromagnetic waves is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An electromagnetic wave sensor cover that solves the above-described problem is configured to be employed in an electromagnetic wave sensor including a transmitting portion that transmits an electromagnetic wave and a receiving portion that receives the electromagnetic wave. The electromagnetic wave sensor cover includes a cover body configured to cover the transmitting portion and the receiving portion from a front in a transmission direction of the electromagnetic wave from the transmitting portion. The cover body includes a base layer made of synthetic resin and permitting passage of the electromagnetic wave, one or more metal oxide layers permitting passage of the electromagnetic wave and being conductive, one or more low refractive index layers permitting passage of the electromagnetic wave and made of material that has a lower refractive index than material of the metal oxide layer, and two electrodes disposed in contact with the metal oxide layer to energize the metal oxide layer so that the metal oxide layer generates heat. The base layer includes a front surface and a rear surface in the transmission direction. The metal oxide layer and the low refractive index layer are laminated adjacent to each other in the transmission direction. A laminate of the metal oxide layer and the low refractive index layer is laminated on the front surface or the rear surface of the base layer.

Other features and aspects will be apparent from the following detailed description, the drawings, and the claims.

BRIEF DESCRIPTION OF DRAWINGS

FIG. 1 is a side cross-sectional view schematically showing an infrared sensor cover according to a first embodiment together with an infrared sensor.

FIG. 2 is a side cross-sectional view schematically showing the infrared sensor in which the cover is an infrared sensor cover according to a second embodiment.

FIG. 3 is a side cross-sectional view schematically showing the cover body according to a modification.

FIG. 4 is a side cross-sectional view schematically showing the cover body according to another modification.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A first embodiment of an electromagnetic wave sensor cover employed in an infrared sensor cover 19 for a vehicle 11 will now be described with reference to the drawings. The direction in which the vehicle 11 travels forward is hereinafter referred to as the front. The reverse direction is hereinafter referred to as the rear.

As shown in FIG. 1, the front end of the vehicle 11 includes a front-monitoring infrared sensor 12. The infrared sensor 12 is an example of an electromagnetic wave sensor. The infrared sensor 12 transmits infrared rays IR (electromagnetic waves), each having a wavelength of 900 nm or the like, toward the front of the vehicle 11 and receives the infrared rays IR that have struck and have been reflected by an object outside of the vehicle. Such an object includes, for example, a vehicle leading the vehicle 11 and pedestrians.

Since the infrared sensor 12 transmits the infrared rays IR toward the front of the vehicle 11 as described above, the infrared sensor 12 transmits the infrared rays IR in a direction from the rear to the front of the vehicle 11. The front in the transmission direction of the infrared rays IR substantially matches the front of the vehicle 11. The rear in the transmission direction of the infrared rays IR substantially matches the rear of the vehicle 11. Thus, the front in the transmission direction of the infrared rays IR is hereinafter simply referred to as "frontward," "front," or the like, and the rear in the transmission direction of the infrared rays IR is hereinafter simply referred to as "rearward," "rear," or the like.

As shown in FIG. 1, the rear half of the outer portion of the infrared sensor 12 corresponds to a box-shaped case 13 having a closed end. The front half of the outer portion of the infrared sensor 12 is a box-shaped cover 14 having a closed end. The case 13 includes a tubular peripheral wall 15 and a bottom wall 16. The bottom wall 16 is located at the rear end of the peripheral wall 15. The entire case 13 is made of a synthetic resin material, such as polybutylene terephthalate (PBT). The case 13 includes a transmitting portion 17 and a receiving portion 18 on the front surface of the bottom wall 16. The transmitting portion 17 transmits the infrared rays IR. The receiving portion 18 receives the infrared rays IR.

More specifically, the infrared sensor 12 includes the case 13 to which the transmitting portion 17 and the receiving portion 18 are coupled, and the cover 14 that is located frontward from the case 13 and covers the transmitting portion 17 and the receiving portion 18 from the front. The cover 14 is made of, for example, polycarbonate (PC), polymethyl methacrylate (PMMA), cyclo olefin polymer (COP), or resin glass. The cover 14 permits the passage of infrared rays.

The infrared sensor cover 19 is disposed in front of the infrared sensor 12 and is separate from the infrared sensor 12. The infrared sensor cover 19 is an example of the electromagnetic wave sensor cover. The infrared sensor cover 19 includes a plate-shaped cover body 20. The cover body 20 is located frontward from the cover 14. The cover body 20 indirectly covers the transmitting portion 17 and the receiving portion 18 from the front, with the cover 14 located between the cover body 20 and the transmitting and receiving portions 17, 18. The cover body 20 is fixed to the vehicle 11 by a fixing member (not shown).

The cover body 20 has a structure including four layers laid out in the front-rear direction. More specifically, the cover body 20 includes a hard coating layer 21, a base layer 22, a metal oxide layer 23, and a low refractive index layer 24 that are laminated in this order from the front side. The cover body 20 includes two electrodes 25 that sandwich the metal oxide layer 23 in the up-down direction.

The base layer 22 is a part of the skeleton frame of the cover body 20. The base layer 22 includes a front surface 221 and a rear surface 222 in the transmission direction of the infrared rays IR. The base layer 22 is made of a transparent synthetic resin material that permits passage of the infrared rays IR. The base layer 22 of the present embodiment is made of polycarbonate (PC). The base layer 22 may be made of material other than PC; that is, polymethyl methacrylate (PMMA), cyclo olefin polymer (COP), or the like.

The hard coating layer 21 permits passage of the infrared rays IR and has a higher hardness than the base layer 22. The hard coating layer 21 is formed by applying a known finishing agent to the front surface 221 of the base layer 22. Examples of the finishing agent include an organic hard coating agent (e.g., acrylate agent, oxetane agent, and silicone agent), an inorganic hard coating agent, and an organic-inorganic hybrid hard coating agent. The hard coating agent may be an agent that is hardened when irradiated with ultraviolet rays, or may be an agent that is hardened when receiving heat.

The hard coating layer 21 makes the cover body 20 more resistant to impact. Thus, the hard coating layer 25 limits situations in which the front surface of the cover body 20 is damaged by pebbles or the like. Further, the hard coating layer 21 makes the cover body 20 more resistant to weather. Thus, the hard coating layer 21 limits situations in which sunlight, wind, rain, temperature change, or the like varies the properties of the cover body 20 and degrades the cover body 20.

The metal oxide layer 23 is laminated adjacent to the rear surface 222 of the base layer 22. The metal oxide layer 23 permits passage of the infrared rays IR and is conductive. Resistance heating is performed for the metal oxide layer 23 through energization. That is, the entire metal oxide layer 23 generates heat through Joule heating that occurs when current is supplied to the metal oxide layer 23. Thus, the metal oxide layer 23 functions as a heater.

The metal oxide layer 23 of the present embodiment is made of indium zinc oxide (IZO, registered trademark), which is transparent and conductive. The metal oxide layer 23 may be made of material that is transparent and conductive other than IZO (registered trademark). Examples of such material include indium tin oxide (ITO), aluminum zinc oxide (AZO), gallium zinc oxide (GZO), antimony tin oxide (ATO), or fluorine tin oxide (FTO).

The low refractive index layer 24 is laminated adjacent to the rear surface of the metal oxide layer 23. That is, the metal oxide layer 23 and the low refractive index layer 24 are laminated adjacent to each other in the transmission direction of the infrared rays IR, and a laminate of the metal oxide layer 23 and the low refractive index layer 24 is laminated on the rear surface 222 of the base layer 22. The low refractive index layer 24 permits passage of the infrared rays IR and is made of material that has a lower refractive index than the material of the metal oxide layer 23. The low refractive index layer 24 of the present embodiment is made of silicon dioxide ($SiO_2$). Silicon dioxide is insulative. Thus, the low refractive index layer 24 covers the rear surface of the metal oxide layer 23 so as to insulate the metal oxide layer 23 that is energized. The low refractive index layer 24 accordingly stops the flow of current between the metal oxide layer 23 and another member.

The two electrodes 25 are made of metal (e.g., copper). The two electrodes 25 are in contact with the metal oxide layer 23 so as to be electrically connected to the upper and lower ends of the metal oxide layer 23, respectively. That is, the two electrodes 25 sandwich the metal oxide layer 23 in the up-down direction to energize the metal oxide layer 23 so that the metal oxide layer 23 generates heat.

In this case, the two electrodes 25 are in contact with the base layer 22. Further, in this case, the two electrodes 25 are located outside of a region of the cover body 20 through which the infrared rays IR pass. The two electrodes 25 are thinner than the metal oxide layer 23. The two electrodes 25 are connected to a power supply (not shown). Thus, the metal oxide layer 23 is energized by the power supply (not shown) via the two electrodes 25.

The operation of the infrared sensor cover 19 will now be described.

In the vehicle 11 including the infrared sensor 12, when the infrared rays IR are transmitted from the transmitting portion 17, the infrared rays IR are applied to the rear part of the cover body 20. The reflection of the applied infrared rays IR on the rear part of the cover body 20 is limited by an interference structure between the low refractive index layer 24 and the metal oxide layer 23, which are located at the rear part of the cover body 20.

More specifically, the low refractive index layer 24 and the metal oxide layer 23 are configured such that reflected waves of the infrared rays IR reflected on the boundary of an air layer and the low refractive index layer 24 and reflected waves of the infrared rays IR reflected on the boundary of the low refractive index layer 24 and the metal oxide layer 23 interfere with each other and weaken each other.

After sequentially passing through the low refractive index layer 24 and the metal oxide layer 23, the infrared rays IR sequentially pass through the base layer 22 and the hard coating layer 21. The infrared rays IR that have passed through the cover body 20 in the above-described manner strike and are reflected by an object outside of the vehicle. Such an object includes, for example, a vehicle leading the vehicle 11 and the pedestrians. The reflected infrared rays IR again pass through the hard coating layer 21, the base layer 22, the metal oxide layer 23, and the low refractive index layer 24 of the cover body 20 in this order.

The infrared rays IR that have passed through the cover body 20 are received by the receiving portion 18. In the infrared sensor 12, the infrared rays IR transmitted from the transmitting portion 17 and the infrared rays IR received by the receiving portion 18 are used to recognize the object and detect the distance between the vehicle 11 and the object, the relative speed, and the like.

Since the interference structure between the low refractive index layer 24 and the metal oxide layer 23 limits the reflection of the infrared rays IR, a larger amount of the infrared rays IR pass through the cover body 20. Thus, the cover body 20 does not notably hinder passage of the infrared rays IR. Thus, the amount in which the cover body 20 attenuates the infrared rays IR transmitted from the transmitting portion 17 easily falls within an allowable range. As a result, the infrared sensor 12 easily recognizes the object and detects the distance between the object and the vehicle 11, the relative speed, and the like in an effective manner.

The entire metal oxide layer 23 generates heat when energized. This heat is evenly conveyed to the entire cover body 20 so that the entire cover body 20 is heated. Thus, the front surface of the cover body 20, which is exposed to the outside of the vehicle, is evenly heated as well. Thus, even if ice and snow adhere to any portion of the front surface of the cover body 20, the ice and snow are quickly melted by the heat conveyed from the metal oxide layer 23.

Such a structure limits situations in which the adhesion of ice and snow to the front surface of the cover body 20 prevents passage of the infrared rays IR. As a result, even in the case of snowy weather, the infrared sensor 12 sufficiently recognizes the object and detects the distance between the object and the vehicle 11, the relative speed, and the like.

As described above, the metal oxide layer 23 of the infrared sensor cover 19 in the present embodiment has two functions: namely, the metal oxide layer 23 functions as a heater and functions to limit reflection of the infrared rays IR with the low refractive index layer 24.

The first embodiment described above in detail has the following advantages.

(1-1) The infrared sensor cover 19 is configured to be employed in the infrared sensor 12 including the transmitting portion 17, which transmits the infrared rays IR, and the receiving portion 18, which receives the infrared rays IR. The infrared sensor cover 19 includes the cover body 20. The cover body 20 is configured to cover the transmitting portion 17 and the receiving portion 18 from the front in the transmission direction of the infrared rays IR from the transmitting portion 17. The cover body 20 includes the base layer 22, one or more metal oxide layers 23, one or more low refractive index layers 24, and the two electrodes 25. The base layer 22 is made of synthetic resin and permits passage of the infrared rays IR. The metal oxide layer 23 permits passage of the infrared rays IR and is conductive. The low refractive index layer 24 permits passage of the infrared rays IR and is made of material that has a lower refractive index than the material of the metal oxide layer 23. The two electrodes 25 are disposed in contact with the metal oxide layer 23 to energize the metal oxide layer 23 so that the metal oxide layer 23 generates heat. The base layer 22 includes the front surface 221 and the rear surface 222 in the transmission direction of the infrared rays IR. The metal oxide layer 23 and the low refractive index layer 24 are laminated adjacent to each other in the transmission direction of the infrared rays IR. The laminate of the metal oxide layer 23 and the low refractive index layer 24 is laminated on the rear surface 222 of the base layer 22.

In this structure, energizing the metal oxide layer 23 causes the entire metal oxide layer 23 to generate heat. This allows the cover body 20 to be evenly heated. In addition, the low refractive index layer 24, which has a lower refractive index than the metal oxide layer 23, is laminated adjacent to the metal oxide layer 23. Thus, reflection of the infrared rays IR is limited. This allows the entire cover body 20 to be evenly heated while limiting reflection of the infrared rays IR on the cover body 20.

(1-2) In the infrared sensor cover 19, the laminate of the metal oxide layer 23 and the low refractive index layer 24 is laminated on the rear surface 222 of the base layer 22 in the transmission direction of the infrared rays IR.

This structure allows the base layer 22 to protect the metal oxide layer 23 and the low refractive index layer 24.

(1-3) In the infrared sensor cover 19, the metal oxide layer 23 is made of indium zinc oxide.

Since indium zinc oxide is transparent, this structure allows the infrared rays IR to pass through the metal oxide layer 23 more easily. Additionally, since the metal oxide layer 23 is made of indium zinc oxide, which is transparent, the metal oxide layer 23 is hard to see from the outside. This improves the design of the infrared sensor cover 19.

(1-4) In the infrared sensor cover 19, the low refractive index layer 24 is made of silicon dioxide.

Silicon dioxide is readily available. Thus, this structure facilitates manufacturing of the low refractive index layer 24.

(1-5) In the infrared sensor cover 19, the electrodes 25 are made of metal.

Metal is readily available. Thus, this structure facilitates manufacturing of the electrodes 25.

Second Embodiment

A second embodiment of an electromagnetic wave sensor cover employed in an infrared sensor cover 31 for a vehicle 11 will now be described with reference to the drawings. As shown in FIG. 2, the second embodiment is the same as the first embodiment except for the arrangement of the infrared sensor cover 31 on the infrared sensor 12. Thus, only the difference of the second embodiment from the first embodiment will be described, and redundant descriptions will be omitted. The same reference numerals are given to the components of the second embodiment that are the same as the corresponding components of the first embodiment.

As shown in FIG. 2, the rear half of the outer portion of the infrared sensor 12 corresponds to the case 13 and the front half corresponds to a cover 32. The cover 32 of the infrared sensor 12 is used as the infrared sensor cover 31, which is an example of the electromagnetic wave sensor cover. The infrared sensor cover 31 includes a tubular peripheral wall 33 and a plate-shaped cover body 34. The cover body 34 is located at the front end of the peripheral wall 33.

The cover body 34 is sized so as to close the front end of the case 13. That is, the cover body 34 has the same structure as the cover body 20 (see FIG. 1) of the first embodiment and is smaller than the cover body 20. The cover body 34 covers the transmitting portion 17 and the receiving portion 18 from the front.

The second embodiment described above in detail has the following advantage in addition to advantages (1-1) to (1-5).

(2-1) The cover 32 of the infrared sensor 12 is used as the infrared sensor cover 31. That is, the infrared sensor cover 31 is a part of the infrared sensor 12. This reduces the amount of space the infrared sensor 12 occupies in the vehicle 11 as compared with when the infrared sensor cover 19 is separate from the infrared sensor 12 in the first embodiment.

Modifications

The above-described embodiments may be modified as follows. The above-described embodiments and the following modifications can be combined as long as the combined modifications remain technically consistent with each other.

The cover body 20 or 34 may be changed to a cover body 41 shown in FIG. 3. The cover body 41 includes the hard coating layer 21, base layer 22, low refractive index layer 24, metal oxide layer 23, low refractive index layer 24, metal oxide layer 23, and low refractive index layer 24 that are laminated in this order from the front side. The cover body 41 further includes two electrodes 25 that sandwich three low refractive index layers 24 and two metal oxide layers 23 in the up-down direction. That is, the cover body 41 includes multiple (three in this case) metal oxide layers 23 and multiple (two in this case) low refractive index layers 24, and the two metal oxide layers 23 and the three low refractive index layers 24 are alternately laminated. Additionally, the cover body 41 includes the two electrodes 25 that extend in the front-rear direction so as to sandwich all the metal oxide layers 23 and all the low refractive index layers 24 in the up-down direction.

In this structure, multiple metal oxide layers 23 with refractive indices different from those of multiple low refractive index layers 24 are alternately laminated. This further limits reflection of the infrared rays IR (electromagnetic waves) on the cover body 41 while evenly heating the cover body 41. Additionally, the two electrodes 25 extend in the front-rear direction so as to sandwich all the metal oxide layers 23 and all the low refractive index layers 24 in the up-down direction. This allows the two electrodes 25 to protect all the metal oxide layers 23 and all the low refractive index layers 24 while energizing all the metal oxide layers 23.

In the cover body 41 shown in FIG. 3, as long as the metal oxide layers 23 and the low refractive index layers 24 are alternately laminated, the number of the metal oxide layers 23 and the number of the low refractive index layers 24 may be changed. In this case, the rearmost layer of the metal oxide layers 23 and the low refractive index layers 24 is preferably a low refractive index layer 24. Further, in this case, the frontmost layer of the metal oxide layers 23 and the low refractive index layers 24 may be a metal oxide layer 23.

In the cover body 41 shown in FIG. 3, the two electrodes 25 may sandwich one or more metal oxide layers 23 in the up-down direction. That is, for example, the two electrodes 25 may sandwich only one metal oxide layer 23, or may sandwich only one metal oxide layer 23 and one low refractive index layer 24. Alternatively, the two electrodes 25 may extend so as not to sandwich the low refractive index layer 24 located at the rearmost end.

The cover body 20 or 34 may be changed to a cover body 42 shown in FIG. 4. The cover body 42 includes the hard coating layer 21, low refractive index layer 24, metal oxide layer 23, base layer 22 that are laminated in this order from the front side. The cover body 42 includes two electrodes 25 that sandwich the metal oxide layer 23 in the up-down direction. That is, the cover body 42 has a laminate of the metal oxide layer 23 and the low refractive index layer 24 laminated on the front surface 221 of the base layer 22. In this case, the position of the metal oxide layer 23 and the position of the low refractive index layer 24 may be replaced with each other.

The two electrodes 25 may be made of material other than metal.

The low refractive index layer 24 may be made of material other than silicon dioxide.

The hard coating layer 21 may be omitted.

The infrared sensor 12 in which the transmitting portion 17 and the receiving portion 18 are covered by the infrared sensor cover 19 or 31 may transmit and receive infrared rays IR each having a wavelength of 1550 nm, instead of a wavelength of 900 nm.

The infrared sensor covers 19 and 31 are applicable to a structure in which the infrared sensor 12 is located at a part that differs from the front part of the vehicle 11, for example, at the rear part of the vehicle 10. In this case, the infrared sensor 12 transmits the infrared rays IR toward the rear of the vehicle 11. Further, in this case, the infrared sensor covers 19 and 31 are located frontward from the transmitting portion 17 and the receiving portion 18 in the transmission direction of the infrared rays IR; that is, located rearward from the transmitting portion 17 and the receiving portion 18 in the vehicle 11. Likewise, the infrared sensor covers 19 and 31 are applicable to a structure in which the infrared sensor 12 is located at a diagonally front side or a diagonally rear side of the vehicle 11.

The infrared sensor covers 19 and 31 are applicable to a structure in which the infrared sensor 12 is mounted in a conveyance that differs from the vehicle 11 (e.g., a train, an airplane, or a ship).

The electromagnetic wave sensor cover may be applied to an electromagnetic wave sensor other than the infrared sensor 12, such as a millimeter wave sensor.

The infrared sensor cover 19 of the first embodiment may be applied to a vehicle exterior part that functions to decorate the vehicle 11. Examples of such a vehicle exterior part include an emblem, an ornament, or a mark.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An electromagnetic wave sensor cover configured to be employed in an electromagnetic wave sensor including a transmitting portion that transmits an electromagnetic wave and a receiving portion that receives the electromagnetic wave, the electromagnetic wave sensor cover comprising a cover body configured to cover the transmitting portion and the receiving portion from a front in a transmission direction of the electromagnetic wave from the transmitting portion, wherein:
the cover body includes:
a base layer made of synthetic resin and permitting passage of the electromagnetic wave;
one or more metal oxide layers permitting passage of the electromagnetic wave and being conductive;
one or more low refractive index layers permitting passage of the electromagnetic wave and made of material that has a lower refractive index than material of the metal oxide layer; and
two electrodes disposed in contact with the metal oxide layer to energize the metal oxide layer so that the metal oxide layer generates heat,
the base layer includes a front surface and a rear surface in the transmission direction, the metal oxide layer and the low refractive index layer are laminated adjacent to each other in the transmission direction,
a laminate of the metal oxide layer and the low refractive index layer is laminated on the front surface or the rear surface of the base layer, and
the laminate of the metal oxide layer and the low refractive index layer is laminated on the rear surface of the base layer.

2. The electromagnetic wave sensor cover according to claim 1, wherein
the electrodes are made of metal.

3. The electromagnetic wave sensor cover according to claim 1, wherein
the metal oxide layer is made of indium tin oxide or indium zinc oxide.

4. The electromagnetic wave sensor cover according to claim 1, wherein the two electrodes extend so as to sandwich all the one or more metal oxide layers and all the one or more low refractive index layers.

5. An electromagnetic wave sensor cover configured to be employed in an electromagnetic wave sensor including a transmitting portion that transmits an electromagnetic wave and a receiving portion that receives the electromagnetic wave, the electromagnetic wave sensor cover comprising a cover body configured to cover the transmitting portion and the receiving portion from a front in a transmission direction of the electromagnetic wave from the transmitting portion, wherein:
the cover body includes:
a base layer made of synthetic resin and permitting passage of the electromagnetic wave;
one or more metal oxide layers permitting passage of the electromagnetic wave and being conductive;
one or more low refractive index layers permitting passage of the electromagnetic wave and made of material that has a lower refractive index than material of the metal oxide layer; and
two electrodes disposed in contact with the metal oxide layer to energize the metal oxide layer so that the metal oxide layer generates heat,
the base layer includes a front surface and a rear surface in the transmission direction,
the metal oxide layer and the low refractive index layer are laminated adjacent to each other in the transmission direction,
a laminate of the metal oxide layer and the low refractive index layer is laminated on the front surface or the rear surface of the base layer, and
the low refractive index layer is made of silicon dioxide.

6. An electromagnetic wave sensor cover, configured to be employed in an electromagnetic wave sensor including a transmitting portion that transmits an electromagnetic wave and a receiving portion that receives the electromagnetic wave, the electromagnetic wave sensor cover comprising a cover body configured to cover the transmitting portion and the receiving portion from a front in a transmission direction of the electromagnetic wave from the transmitting portion, wherein:
the cover body includes:
a base layer made of synthetic resin and permitting passage of the electromagnetic wave;
one or more metal oxide layers permitting passage of the electromagnetic wave and being conductive;
one or more low refractive index layers permitting passage of the electromagnetic wave and made of material that has a lower refractive index than material of the metal oxide layer; and
two electrodes disposed in contact with the metal oxide layer to energize the metal oxide layer so that the metal oxide layer generates heat,
the base layer includes a front surface and a rear surface in the transmission direction,
the metal oxide layer and the low refractive index layer are laminated adjacent to each other in the transmission direction,
a laminate of the metal oxide layer and the low refractive index layer is laminated on the front surface or the rear surface of the base layer,
wherein the one or more metal oxide layers are metal oxide layers, the one or more low refractive index layers are low refractive index layers, and the metal oxide layers and the low refractive index layers are alternately laminated.

* * * * *